United States Patent [19]

Horiuchi

[11] Patent Number: 5,320,998
[45] Date of Patent: Jun. 14, 1994

[54] CATALYST FOR PURIFYING EXHAUST GASES OF DIESEL ENGINE

[75] Inventor: Makoto Horiuchi, Himeji, Japan

[73] Assignee: Nippon Shokubai Co., Ltd., Osaka, Japan

[21] Appl. No.: 936,276

[22] Filed: Aug. 28, 1992

[30] Foreign Application Priority Data

Sep. 5, 1991 [JP] Japan ................... 3-225679

[51] Int. Cl.⁵ .................. B01J 23/72; B01J 23/74; B01J 21/06; B01J 21/04
[52] U.S. Cl. ................... 502/245; 502/337; 502/325; 502/335; 502/332; 502/331; 502/259; 502/260; 502/242; 423/215.5
[58] Field of Search ............. 423/215.5; 502/337, 502/325, 335, 332, 245, 331, 259, 260, 527, 242

[56] References Cited

U.S. PATENT DOCUMENTS

| | | | |
|---|---|---|---|
| 4,711,870 | 12/1987 | Yamada et al. | 502/331 X |
| 4,749,671 | 6/1988 | Saito et al. | 502/331 X |
| 5,059,575 | 10/1991 | Jorgensen et al. | 502/304 |
| 5,106,802 | 4/1992 | Horiuchi et al. | 502/337 X |

FOREIGN PATENT DOCUMENTS

| | | |
|---|---|---|
| 0092023 | 10/1983 | European Pat. Off. |
| 0373665 | 6/1990 | European Pat. Off. |
| 0382434 | 8/1990 | European Pat. Off. |
| 0449423 | 10/1991 | European Pat. Off. |

Primary Examiner—W. J. Shine
Assistant Examiner—Douglas J. McGinty
Attorney, Agent, or Firm—Sherman and Shalloway

[57] ABSTRACT

This invention provides a catalyst for purifying exhaust gases of a diesel engine, said catalyst comprising at least one element selected from nickel and cobalt and optionally a copper element. Further, this invention provides a catalyst for purifying exhaust gases of a diesel engine, said catalyst comprising a refractory three-dimensional structure and deposited thereon a catalyst component comprising the above elements and a refractory inorganic oxide. These catalysts can remove harmful ingredients contained in exhaust gases of a diesel engine, such as carbonaceous fine particles, unburned hydrocarbons, carbon monoxide, etc. by burning from low temperatures and suppress sulfate formation from sulfur dioxide.

5 Claims, No Drawings

CATALYST FOR PURIFYING EXHAUST GASES OF DIESEL ENGINE

This invention relates to a catalyst for purifying exhaust gases of a diesel engine. More specifically, this invention relates to a catalyst for purifying exhaust gases of a diesel engine, which can remove harmful substances, such as carbonaceous fine particles, unburned hydrocarbons, carbon monoxide and etc. in exhaust gases of a diesel engine by combustion, and suppress the formation of sulfates.

In recent years, particulate substances (composed mainly of solid carbonaceous fine particles, sulfur-type fine particles such as sulfates, liquid or solid high-molecular hydrocarbon fine particles, and the like; they are called "particulate substances" hereinafter) in exhaust gases of a diesel engine have caused a problem with physiological hazard. The reason is that since most of the particulate substances have the particle size of less than 1 micron, they are liable to float in an ambient atmosphere and easily taken in a human body. Accordingly, it has been considered to introduce tough regulations over exhaust of these particulate substances from diesel engine.

Meanwhile, the amounts of the particulate substances exhausted from the diesel engine have been reduced to a certain extent with improvements such as exertion of a higher pressure in fuel jet and control of fuel jet timing in the diesel engine. However, such a reduction is not said to be sufficient yet. Moreover, a soluble organic fraction (SOF) contained in the particulate substances and composed mainly of liquid high-molecular hydrocarbons cannot be removed by the above improvements of the engine, which results in increasing the proportion of SOF in the particulate substances. Since said SOF contains harmful components such as carcinogenic substances, etc., removal of SOF along with the particulate substances has become a serious issue.

As a method of removing particulate substances, a catalytic system has been studied which comprises capturing particulate substances in exhaust gases of a diesel engine with a catalyst wherein a catalytic substance capable of burning carbonaceous particles is deposited on a refractory three-dimensional structure such as a ceramic foam, a wire mesh, a metallic foam, a closed ceramic honeycomb, an open flow-type ceramic homeycomb, a metal honeycomb or the like, and removing carbonaceous fine particles under exhaust conditions (a gas composition and a temperature) of exhaust gases obtained under usual running conditions of the diesel engine, optionally using a heating means such as an electric heater.

In general, as a catalyst for purifying exhaust gases of a diesel engine, a catalyst having the following properties is expected.

(a) Efficiency of burning from low temperatures harmful ingredients such as carbonaceous fine particles, unburned hydrocarbons, carbon monoxide, etc.

(b) Oxidizability into sulfur trioxide ($SO_3$) of sulfur dioxide ($SO_2$) generated from sulfur components in diesel fuel is low, making it possible to suppress formation of sulfates (sulfur trioxide or sulfuric acid mist given by oxidizing sulfur dioxide).

(c) It is possible to withstand continuous operation under high load (i.e., high-temperature durability is high).

Various proposals have been so far made to enhance efficiency of burning and removing carbonaceous fine particles. For instance, Japanese Laid-open Patent Application (Kokai) No. 24597/80 discloses, as a platinum group element-type catalyst, a rhodium (7.5%)-platinum alloy, a platinum/palladium (50/50) mixture, a product comprising tantarum oxide or cerium oxide and palladium deposited thereon, and further an alloy comprising palladium and not more than 75% by weight of platinum. These catalysts are also stated to be effective for removal of SOF.

Nevertheless, in a high temperature region of more than 500° C., these components abruptly increase in oxidizability of sulfur dioxide, causing increase in sulfates. Consequently, it could scarcely be applied to a high-temperature diesel engine an exhaust temperature of which is elevated to a temperature region of about 700° C. For this reason, it is undesirous to apply these components to the high-temperature diesel engine.

Japanese Laid-open Patent Application (Kokai) Nos. 129030/1986, 149222/1986 and 146314/1986 disclose catalyst compositions containing palladium and rhodium as main active components and further alkali metals, alkaline earth metals, copper, lantanum, zinc and manganese as additional ingredients. Japanese Laid-open Patent Application (Kokai) No. 82944/1984 discloses a catalyst composition comprising at least one element selected from copper, alkali metals, molybdenum and vanadium, and at least one element selected from platinum, rhodium and palladium.

Of these elements, vanadium is not stable in exhaust gases of the diesel engine of higher than 500° C.; therefore, it can not be applied.

Moreover, an open-type honeycomb noble metal oxide catalyst having open channel parallel to a gas flow has been reported as a catalyst of removing SOF in exhaust gases of a diesel engine (SAE Paper, 810263).

[Problems the Invention Seeks to Solve]

The aforesaid ordinary catalysts are all effective for burning and removal of carbonaceous fine particles or removal of SOF to some extent, but have high oxidizability of sulfur dioxide under a condition of exhaust gases having a high temperature of more than 500° C., with the result that amounts of sulfates generated increase, a rate of removal of all particulate substances rather decreases and the sulfates pose a new environmental problem.

That is to say, a catalyst that sufficiently possesses the aforesaid properties (a)-(c) required of the catalyst for purifying exhaust gases of the diesel engine and removability of SOF has not yet been found.

Accordingly, it is an object of this invention to provide a catalyst for purifying exhaust gases of a diesel engine, said catalyst being capable of removing particulate substances in exhaust gases of a diesel engine with good efficiency.

Another object of this invention is to provide a catalyst for purifying exhaust gases of a diesel engine which catalyst has performance of burning and removing from low temperatures harmful ingredients in exhaust gases of a diesel engine, such as carbonaceous fine particles, unburned hydrocarbons, carbon monoxide, etc. and is low in oxidizability of sulfur dioxide even under a condition of exhaust gases having a high temperature of more than 500° C., making it possible to suppress formation of sulfates.

Still another object of this invention is to provide a catalyst for purifying exhaust gases of a diesel engine which can remove SOF in exhaust gases of a diesel engine with good efficiency.

The other object of this invention is to provide a catalyst for purifying exhaust gases of a diesel engine which catalyst is good in high-temperature durability and can be installed on a diesel car without posing a practical problem.

Means for Solving the Problems

The present inventors have made extensive studies to achieve the aforesaid objects, and have consequently found that a catalyst comprising at least one element selected from nickel and cobalt is an excellent catalyst having ability to purify SOF, unburned hydrocarbons, etc. from low temperatures in exhaust gases of a diesel engine and showing an effect of suppressing oxidation of sulfur dioxide even in a high temperature region exceeding 500° C. They have thus perfected this invention on the basis of this finding.

This invention will be described in detail below.

This invention provides a catalyst for purifying exhaust gases of a diesel engine, said catalyst comprising at least one element selected from nickel and cobalt. Especially, a preferable catalyst of this invention is a catalyst wherein a catalyst component comprising at least one element selected from nickel and cobalt, and a refractory inorganic oxide is deposited on a refractory three-dimensional structure.

It is preferable that the refractory inorganic oxide is at least one type selected from the group consisting of activated almina, silica, titania, zirconia, silica-alumina, alumina-zirconia, alumina-titania, silica-titania, silica-zirconia and titania-zirconia.

It is preferable that the refractory three-dimensional structure is an open flow-type ceramic honeycomb or metal honeycomb.

An amount deposited, per liter of a catalyst, of at least one element selected from nickel and cobalt is 0.5 to 50 g. When it is less than 0.5 g, activity is low. When it exceeds 50 g, improvement of activity equivalent to the amount added is not obtained.

Nickel or cobalt starting materials are not particularly specified, and those ordinarily used in the art are available. Examples thereof are metals, oxides, carbonates, nitrates, sulfates, hydroxides and acetates.

As a preferable embodiment of this inveniton, a catalyst comprising at least one element selected from nickel and cobalt and further a copper element in an amount deposited, as an oxide, of 0.1 to 1.0 g per liter of a three-dimensional structure, a ratio of the amount deposited, as an oxide, of the copper element to the amount deposited, as an oxide, of at least one element selected from nickel and cobalt [CuO/(NiO and/or Co$_2$O$_3$)] being 0.01 to 0.5, shows excellent performance that it can purify SOF from low temperatures and suppress oxidizability of sulfur dioxide even under a condition of high temperature exhaust gases of 500° C. or more.

When the amount deposited of copper is larger than 1.0 g or the above ratio is higher than 0.5, formation of sulfates in the temperature region of more than 500° C. increases. Meanwhile, when the amount deposited of copper is smaller than 0.1 g or the above ratio is lower than 0.01, the effect given by the addition of copper is not found. Thus, both are unwanted.

Copper starting materials are not particularly limited, and those ordinarily used in the art are available. Examples thereof are metals, oxides, carbonates, nitrates, sulfates, hydroxides and acetates.

The refractory inorganic oxide is at least one type selected from activated alumina, silica, titania, zirconia, silica-alumina, alumina-zirconia, alumina-titania, silica-titania, silica-zirconia and titania-zirconia. Of these, activated alumina, silica, titania and zirconia are especially preferable.

The amount deposited, per liter of the catalyst, of the refractory inorganic oxide is preferably 1 to 300 g. When it is less than 1 g, the refractory inorganic oxide is less devoted to activity. When it exceeds 300 g, improvement of activity equivalent to the amount added is little. When it is used in a catalyst of a refractory three-dimensional structure, a back pressure tends to increase.

The above elements may be either deposited on, or blended with, the refractory inorganic oxide.

As the refractory three-dimensional structure depositing the catalyst component, an open flow-type ceramic honeycomb or an open flow-type metal honeycomb is suitable.

The catalyst of this invention can be one in which a catalyst component obtained by dispersing and depositing at least one element selected from nickel and cobalt and optionally a copper element on a refractory inorganic oxide is deposited on a refractory three-dimensional structure.

Incidentally, the word "element" used in the present specification includes a metal and an oxide.

A method for preparing the catalyst of this invention is not particularly limited, and can be prepared by the following method (1) or (2), for example.

(1) A powder of the refractory inorganic oxide is wet-pulverized and slurried, and the refractory three-dimensional structure is dipped in the slurry. After excess slurry is removed, the product is dried at 80° to 250° C., and then calcined at 300° to 850° C. The refractory three-dimensional structure is then dipped in an aqueous solution containing given amounts of compounds of nickel and/or cobalt and optionally copper. After excess solution is removed, the product is dried at 80° to 250° C., and then calcined at 300° to 850° C. to obtain a final catalyst.

(2) The refractory inorganic oxide is charged and dipped in an aqueous solution containing given amounts of compounds of nickel and/or cobalt and optionally copper. The solution is dried at 80° to 250° C., and the product is then calcined at 300° to 850° C. to form a powder in which the metal oxides are dispersed and deposited on the refractory inorganic oxide. Said powder is wet-pulverized and slurried. The refractory three-dimensional structure is dipped in the slurry. After excess slurry is removed, the product is dried at 80° to 250° C., and then calcined at 300° to 850° C. to obtain a final catalyst.

Effects of the Invention

The catalyst of this invention is excellent in performance of burning and removing from low temperatures harmful ingredients such as carbonaceous fine particles, unburned hydrocarbons, carbon monoxide, etc. and is low in oxidizability of sulfur dioxide even under a condition of exhaust gases having a high temperature of more than 500° C., making it possible to suppress formation of sulfates. Accordingly, the catalyst of this invention is excellent in reducing the particulate substances in exhaust gases of the diesel engine, and the exhaust gases of the diesel engine can be purified by using the catalyst of this invention.

Further, the catalyst of this invention is excellent in removability of SOF and is therefore quite effective for purifying the exhaust gases of the diesel engine.

Still further, since the catalyst of this invention is excellent in high-temperature durability, it can be mounted on a diesel car without causing a practical problem.

Accordingly, the catalyst of this invention has an ability to purify SOF, unburned hydrocarbons, etc. from low temperatures and can exhibit excellent performance that an oxidation rate of sulfur dioxide is controlled to 4% or less even in the high temperature region of 500° to 700° C.

As stated above, the catalyst of this invention is quite useful as a catalyst for purifying exhaust gases of a diesel engine.

EXAMPLES

This invention is illustrated in more detail below by the following Examples and Comparative Examples.

EXAMPLE 1

One kilogram of alumina having a specific surface area of 118 $m^2/g$ was introduced in an aqueous solution of 233.6 g of nickel nitrate in deionized water, well stirred and then dried at 150° C. for 1 hour. The product was further calcined at 500° C. for 2 hours to obtain an alumina powder on which nickel oxide (NiO) was dispersed and deposited. One kilogram of the alumina powder was wet-pulverized and slurried.

In the thus obtained slurry was dipped a cylindrical cordierite honeycomb support provided with about 400 open flow gas passage cells per square inch of a cross-sectional area and having a diameter of 5.6 inches and a length of 6 inches. After excess slurry was removed, the product was dried at 150° C. for 2 hours, and then calcined at 500° C. for 1 hour to obtain a catalyst.

The amounts deposited of alumina and nickel oxide in the catalyst were 50 g and 3.0 g per liter of the structure, respectively.

EXAMPLE 2

One kilogram of zirconia having a specific surface are of 56 $m^2/g$ and 400 g of a nickel oxide powder were charged in deionized water, wet-pulverized and slurried.

In the thus obtained slurry was dipped the same cordierite honeycomb support as used in Example 1. After excess slurry was removed, the product was dried at 150° C. for 1 hour, and then calcined at 700° C. for 1 hour to obtain a catalyst. The amounts deposited of zirconia and nickel oxide in this catalyst were 25 g and 10 g per liter of the structure.

EXAMPLE 3

One kilogram of a titania-zirconia powder (a $TiO_2$/$ZrO_2$ molar ratio 3/7) having a specific surface area of 146 $m^2/g$ was wet-pulverized and slurried.

In the thus obtained slurry was dipped a cylindrical stainless steel honeycomb support provided with about 300 open flow gas passage cells per square inch of a cross-sectional area and having a diameter of 5.66 inches and a length of 6.00 inches. After excess slurry was removed, the product was dried at 150° C. for 1 hour, and then calcined at 400° C. for 1 hour to obtain a structure on which the titania-zirconia powder was deposited.

The structure was dipped in 2.5 liters of an aqueous solution of 320 g of nickel acetate in deionized water. After excess solution was removed, the product was dried at 150° C. for 3 hours, and then calcined at 650° C. for 1 hour to obtain a catalyst.

The amounts deposited of titania-zirconia and nickel oxide in this catalyst were 50 g and 5.0 g per liter of the structure, respectively.

EXAMPLE 4

One kilogram of alumina having a specific surface area of 118 $m^2/g$ was charged in a aqueous solution of 870.2 g of cobalt nitrate in deionized water, well stirred and then dried at 150° C. for 1 hour. Further, the product was calcined at 600° C. for 1 hour to obtain an alumina powder on which cobalt oxide ($Co_2O_3$) was dispersed and deposited. One kilogram of the alumina powder was wet-pulverized and slurried.

In the thus obtained slurry was dipped the same cordierite honeycomb support as used in Example 1. After excess slurry was removed, the product was dried at 150° C. for 1 hour to obtain a catalyst.

The amounts deposited of alumina and cobalt oxide in the catalyst were 50 g and 12 g per liter of the structure, respectively.

EXAMPLE 5

One kilogram of a silica-alumina powder (a $SiO_2$/$Al_2O_3$ molar ratio 2/1) having a specific surface area of 218 $m^2/g$ was charged in an aqueous solution of 1,582 g of cobalt sulfate in deionized water, well stirred and dried at 150° C. for 1 hour. Further, the product was calcined at 600° C. for 1 hour to obtain a silica-alumina powder on which cobalt oxide ($Co_2O_3$) was dispersed and deposited. One kilogram of the silica-alumina powder on which cobalt oxide ($Co_2O_3$) was dispersed and deposited was wet-pulverized and slurried.

In the thus obtained slurry was dipped the same cordierite honeycomb support as used in Example 1. After excess slurry was removed, the product was dried at 150° C. for 1 hour to obtain a catalyst.

The amounts deposited of silica-alumina and cobalt oxide in this catalyst were 62 g and 28 g per liter of the structure, respectively.

EXAMPLE 6

One kilogram of alumina having a specific surface area of 158 $m^2/g$ was charged in an aqueous solution of 78.4 g of nickel acetate and 547.6 g of cobalt acetate in deionized water, well stirred and dried at 150° C. for 3 hours. Further, the product was calcined at 800° C. for 1 hour to obtain an almina powder on which nickel oxide (NiO) and cobalt oxide ($Co_2O_3$) were dispersed and deposited. One kilogram of the alumina powder was wet-pulverized and slurried.

In the thus obtained slurry was dipped a cylindrical stainless steel honeycomb support provided with about 200 open flow gas passage cells per square inch of a cross-sectional area and having a diameter of 5.66 inches and a length of 6.00 inches. After excess slurry was removed, the product was dried at 150° C. for 1 hour, and then calcined at 400° C. for 1 hour to obtain a catalyst.

The amounts deposited of alumina, nickel oxide and cobalt oxide in this catalyst were 85 g, 2 g and 15 g per liter of the structure, respectively.

EXAMPLE 7

One kilogram of a titania-zirconia powder (a $TiO_2/ZrO_2$ molar ratio 3/1) having a specific surface area of 86 $m^2/g$ was wet-pulverized and slurried.

In the thus obtained slurry was dipped a cylindrical cordierite honeycomb support provided with about 300 open flow gas passage cells per square inch of a cross-sectional area and having a diameter of 5.66 inches and a length of 6.00 inches. After excess slurry was removed, the product was dried at 150° C. for 1 hour, and then calcined at 600° C. for 1 hour to obtain a structure having deposited thereon a titania-zirconia powder.

The structure was dipped in 2.6 liters of an aqueous solution of 132 g of nickel chloride, 307 g of cobalt chloride and 79 g of copper chloride in deionized water. After excess solution was removed, the product was dried at 150° C. for 3 hours, and then calcined at 650° C. for 1 hour to obtain a catalyst.

The amounts deposited of titania-zirconia, nickel oxide, cobalt oxide and copper oxide in the catalyst were 2 g, 5 g and 0.8 g per liter of the structure, respectively.

EXAMPLE 8

One kilogram of zirconia having a specific surface of 45 $m^2/g$ was charged in an aqueous solution of 161.6 g of cobalt sulfate and 12.1 g of copper sulfate in deionized water, well stirred and then dried at 150° C. for 1 hour. The product was calcined at 500° C. for 2 hours to obtain a zirconia powder on which cobalt oxide ($Co_2O_3$) and copper oxide (CuO) were dispersed and deposited. One kilogram of the zirconia powder was wet-pulverized and slurried.

In the thus obtained slurry was dipped a cylindrical honeycomb support provided with about 200 open flow gas passage cells per square inch of a cross-sectional area and having a diameter of 5.66 inches and a length of 6.00 inches. After excess slurry was removed, the product was dried at 150° C. for 2 hours, and then calcined at 500° C. for 1 hour to obtain a catalyst.

The amounts deposited of zirconia, cobalt oxide and copper oxide in the catalyst were 130 g, 6 g and 0.5 g per liter of the structure.

EXAMPLE 9

One kilogram of alumina having a specific surface area of 145 $m^2/g$ was charged in an aqueous solution of 248.5 g of nickel nitrate and 1.3 g of copper nitrate in deionized water, well stirred and dried at 150° C. for 1 hour. Further, the product was calcined at 600° C. for 2 hours to obtain an alumina powder on which nickel oxide ($NiO_2$) and copper oxide (CuO) were dispersed and deposited. One kilogram of the alumina powder was wet-pulverized and slurried.

In the thus obtained slurry was dipped a cylindrical cordierite honeycomb support provided with about 100 open flow gas passage cells per square inch of a cross-sectional area and having a diameter of 5.66 inches and a length of 6.00 inches. After excess slurry was removed, the product was dried at 150° C. for 2 hours to obtain a catalyst.

The amounts deposited of alumina, nickel oxide and copper oxide in the catalyst were 235 g, 15 g and 0.1 g per liter of the structure.

COMPARATIVE EXAMPLE 1

A catalyst was obtained as in Example 1 except that 228 g of copper nitrate was dissolved in deionized water. The amounts deposited of alumina and copper oxide in the catalyst were 50 g and 3.0 g per liter of the structure, respectively.

COMPARATIVE EXAMPLE 2

A catalyst was obtained as in Example 1 except that 158 g of chromium nitrate was dissolved in deionized water. The amounts deposited of alumina and chromium oxide in the catalyst were 50 g and 3.0 g per liter of the structure, respectively.

COMPARATIVE EXAMPLE 3

A catalyst was obtained as in Example 1 except that palladium nitrate containing 20 g of palladium was dissolved in deionized water. The amounts deposited of alumina and palladium in the catalyst were 50 g and 1.0 g per liter of the structure.

COMPARATIVE EXAMPLE 4

A catalyst was obtained as in Example 1 except that chloroplatinic acid containing 20 g of platina was dissolved in deionized water. The amounts deposited of aluminum and platinum in the catalyst were 50 g and 1.0 g per liter of the structure, respectively.

COMPARATIVE EXAMPLE 5

A catalyst was obtained as in Example 1 except that rhodium nitrate containing 20 g of rhodium was dissolved in deionized water. The amounts deposited of alumina and rhodium in the catalyst were 50 g and 1.0 g per liter of the structure.

COMPARATIVE EXAMPLE 6

A catalyst was obtained as in Example 1 except that 200 g of nickel acetate and 12.1 g of copper acetate were dissolved in deionized water. The amounts deposited of alumina, nickel oxide and copper oxide were 50 g, 3.0 g and 1.5 g per liter of the structure, respectively.

COMPARATIVE EXAMPLE 7

A catalyst was obtained as in Example 1 except that 72.5 g of cobalt nitrate and 60.7 g of copper nitrate were dissolved in deionized water. The amounts deposited of alumina, cobalt oxide and copper oxide in the catalyst were 50 g, 1.0 g and 1.0 g per liter of the structure, respectively.

The amounts deposited of the components in the catalysts obtained in Examples 1 to 9 and Comparative Examples 1 to 7 are shown in Table 1.

TABLE 1

| Example | Component of catalytic activity | (g/l-support) | Refractory inorganic oxide | (g/l-support) | Three-dimensional structure Type | Number of cells/in² |
|---|---|---|---|---|---|---|
| 1 | NiO | 3.0 | $Al_2O_3$ | 50 | Ceramic honeycomb | 400 |
| 2 | NiO | 10.0 | $ZrO_2$ | 25 | Ceramic honeycomb | 400 |
| 3 | NiO | 5.0 | $TiO_2/ZrO_2$ (molar ratio 3/7) | 50 | Metal honeycomb | 300 |
| 4 | $Co_3O_4$ | 12.0 | $Al_2O_3$ | 50 | Ceramic honeycomb | 400 |

TABLE 1-continued

| | Component of catalytic activity | | Refractory inorganic oxide | | Three-dimensional structure | |
|---|---|---|---|---|---|---|
| | | (g/l-support) | | (g/l-support) | Type | Number of cells/in$^2$ |
| 5 | Co$_3$O$_4$ | 28.0 | SiO$_2$/Al$_2$O$_3$ (molar ratio 2/1) | 62 | Ceramic honeycomb | 400 |
| 6 | NiO/Co$_3$O$_4$ | 2/15 | Al$_2$O$_3$ | 85 | Metal honeycomb | 200 |
| 7 | NiO/Co$_3$O$_4$/CuO | 2/5/0.8 | TiO$_2$/ZrO$_2$ (molar ratio 3/1) | 42 | Ceramic honeycomb | 300 |
| 8 | Co$_3$O$_4$/CuO | 6/0.5 | ZrO$_2$ | 30 | Ceramic honeycomb | 200 |
| 9 | NiO/CuO | 15/0.1 | Al$_2$O$_3$ | 235 | Metal honeycomb | 100 |
| Comparative Example | | | | | | |
| 1 | CuO | 3.0 | Al$_2$O$_3$ | 50 | Ceramic honeycomb | 400 |
| 2 | Cr$_2$O$_3$ | 3.0 | Al$_2$O$_3$ | 50 | Ceramic honeycomb | 400 |
| 3 | Pd | 1.0 | Al$_2$O$_3$ | 50 | Ceramic honeycomb | 400 |
| 4 | Pt | 1.0 | Al$_2$O$_3$ | 50 | Ceramic honeycomb | 400 |
| 5 | Rh | 1.0 | Al$_2$O$_3$ | 50 | Ceramic honeycomb | 400 |
| 6 | NiO/CuO | 3.0/1.5 | Al$_2$O$_3$ | 50 | Ceramic honeycomb | 400 |
| 7 | Co$_3$O$_4$/CuO | 1.0/1.0 | Al$_2$O$_3$ | 50 | Ceramic honeycomb | 400 |

Evaluation of the Catalyst

Regarding the respective catalysts, performance of purifying exhaust gases of a diezel engine was evaluated by the following method.

In this case, a supercharging direct injection diesel engine (4 cylinders, 2,800 cc) and a diesel oil having a sulfur content of 0.38% by weight as a fuel were used in said method.

The catalyst was installed in an exhaust gas from the engine, and a durability test was performed for 300 hours under conditions of 2,500 rpm (revolution per minute of the engine), full load and a catalyst inlet temperature of 600° C.

Then, the content of the particulate substance in exhaust gases before entering a catalyst bed (inlet) and after leaving the catalyst bed (outlet) was measured by an ordinary dilution tunnel method under stable conditions of 2,000 rpm (revolution per minute of the engine) and catalyst inlet temperatures of 400° C. and 600° C. A rate (%) of purification of the particulate substances was then found.

Moreover, the particulate substances captured with the dilution tunnel was extracted with a dichloromethane solution. From change in weight of the particulate substances before and after extraction, the exhaust amount of SOF was measured, and a rate of purification of SOF was found.

At the same time, sulfur dioxide and gaseous hydrocarbons in exhaust gases before entering the catalyst bed and after passing through the catalyst bed were analyzed, and the conversion (%) was found. The results are shown in Table 2.

TABLE 2

| | Rate of purification of particulate substances (%) | | Rate of purification of SOF (%) | | Rate of purification of hydrocarbons (%) | | Conversion of sulfur dioxide (%) | |
|---|---|---|---|---|---|---|---|---|
| | 400° C. | 600° C. | 400° C. | 600° C. | 400° C. | 600° C. | 400° C. | 600° C. |
| Example | | | | | | | | |
| 1 | 25 | 12 | 52 | 78 | 46 | 86 | 0 | 1.6 |
| 2 | 23 | 13 | 46 | 81 | 52 | 82 | 0 | 0.6 |
| 3 | 21 | 11 | 52 | 76 | 51 | 84 | 0 | 2.1 |
| 4 | 22 | 12 | 52 | 83 | 54 | 81 | 0 | 0.4 |
| 5 | 27 | 14 | 49 | 79 | 46 | 79 | 0 | 0.1 |
| 6 | 22 | 12 | 51 | 83 | 50 | 86 | 0 | 0.5 |
| 7 | 26 | 15 | 61 | 80 | 59 | 84 | 0 | 2.8 |
| 8 | 25 | 14 | 58 | 83 | 60 | 86 | 0 | 1.8 |
| 9 | 24 | 16 | 61 | 85 | 58 | 82 | 0 | 1.0 |
| Comparative Example | | | | | | | | |
| 1 | 6 | −126 | 21 | 56 | 26 | 66 | 0 | 17 |
| 2 | 13 | −285 | 32 | 69 | 38 | 85 | 0 | 35 |
| 3 | −86 | −505 | 76 | 88 | 75 | 93 | 21 | 62 |
| 4 | −220 | −676 | 82 | 86 | 91 | 92 | 48 | 76 |
| 5 | 21 | −342 | 39 | 87 | 42 | 92 | 0 | 42 |
| 6 | 16 | −112 | 42 | 81 | 56 | 78 | 0 | 16 |
| 7 | 19 | −162 | 48 | 79 | 59 | 81 | 0 | 21 |

What is claimed is:

1. A catalyst for purifying exhaust gases of a diesel engine, said catalyst consisting of
   a refractory three-dimensional structure; and deposited thereon
   at least one element selected from nickel and cobalt; and a copper element;
   wherein a weight ratio of an amount deposited, as an oxide, of said copper element to an amount deposited, as an oxide, of said at least one element selected from nickel and cobalt (CuO/(NiO and/or Co$_2$O$_3$)) is 0.01 to less than 0.05.

2. A catalyst for purifying exhaust gases of a diesel engine, said catalyst consisting of
   a refractory three-dimensional structure; and deposited thereon
   a catalyst component comprising
   at least one element selected from nickel and cobalt,
   a refractory inorganic oxide, and a copper element;

wherein a weight ratio of an amount to be deposited, as an oxide, of said copper element to an amount deposited, as an oxide, of said at least one element selected from nickel and cobalt (CuO/(NiO and/or Co$_2$O$_3$)) is 0.01 to less than 0.5.

3. The catalyst of claim 2 wherein the refractory inorganic oxide is at least one type selected from the group consisting of activated alumina, silica, titania, zirconia, silica-alumina, alumina-zirconia, alumina-titania, silica-titania, silica-zirconia and titania-zirconia.

4. The catalyst of claim 2 wherein the refractory three-dimensional structure is an open flow ceramic honeycomb or an open flow metal honeycomb.

5. The catalyst of claim 2 wherein at least one element selected from nickel and cobalt is contained in an amount of 0.5 to 50 g, as an oxide, per liter of the three-dimensional structure, the copper element is contained in an amount of 0.1 to 1.0 g, as an oxide, per liter of the three-dimensional structure, and a weight ratio of the amount deposited, as an oxide, of said copper element to the amount deposited, as an oxide, of said at least one element selected from nickel and cobalt (CuO/(NiO and/or Co$_2$O$_3$)) is 0.01 to less than 0.5.

* * * * *